May 17, 1960     W. E. WESTMAN     2,937,016
HANDLE WEIGHING MECHANISM FOR LUGGAGE
Filed Aug. 19, 1957
FIG. 1
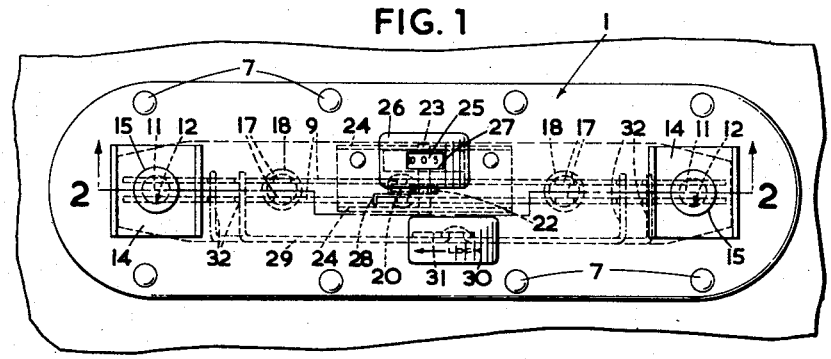
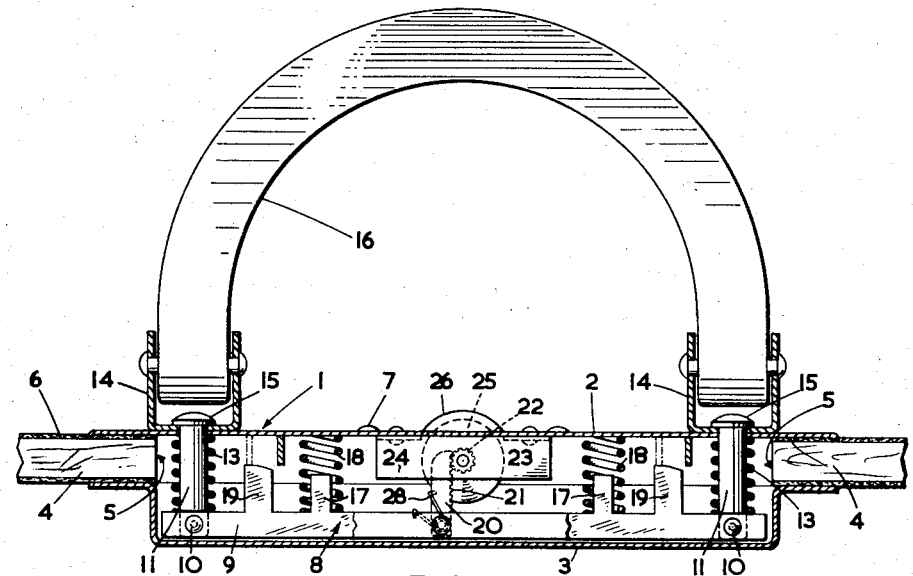
FIG. 2
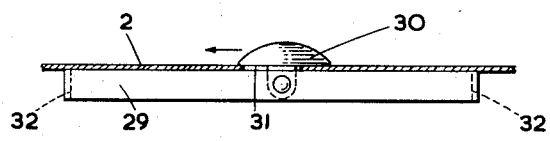
FIG. 3
INVENTOR
W. E. WESTMAN
BY Frederick E. Monley
ATTORNEY

2,937,016

HANDLE WEIGHING MECHANISM FOR LUGGAGE

Willard E. Westman, Peterborough, Ontario, Canada

Application August 19, 1957, Serial No. 678,883

5 Claims. (Cl. 265—67)

This invention relates to weighing devices for luggage.

It has already been proposed to provide a baggage incorporating a weighing device wherein when the baggage is suspended from the handle, a pair of tension springs are caused to be stretched by the weight of the baggage, a scale incorporated in the handle being adapted on operation of an unlocking mechanism to indicate the amount of stretching of the springs, the scale being calibrated to read directly in units of weight. However, the connection between the scale in the movable handle and the relatively fixed baggage involves a relatively long non-rigid linkage which is liable to become maladjusted and therefore to give an incorrect scale reading. Furthermore, the incorporation of the scale and its operating means within the handle necessitates the latter being inconveniently bulky, and the construction of the device is such that the handle cannot be folded and consequently always projects from the baggage in such a manner as to make stowage and storing difficult and to leave the handle exposed whereby the mechanism contained therein can suffer damage.

It is an object of the present invention to provide a weighing device for luggage, in which disadvantages referred to above are wholly or largely overcome.

A weighing device in accordance with the invention, arranged for attachment to a piece of luggage in the position in which a plain handle is normally secured, consists of a handle connected at its ends to a rigid cross-member which can move with the handle in an outward direction against the action of compression spring means when the weight of the luggage is taken by the handle, the cross-member being connected by gearing to a revolvable scale member whereby the amount of movement of the cross-member, which is a function of the weight of the luggage, is indicated by the scale member.

Manually operated locking means is preferably provided for rendering the weighing device inoperative by preventing movement of the cross-member.

The handle is preferably pivotally connected to the cross-member so as to be foldable laterally to the cross-member when not in use.

A constructional example in accordance with the invention is illustrated in the accompanying drawings. In the drawings:

Figure 1 is a plan view of a weighing device attached to a piece of luggage, the handle being omitted, Figure 2 is a side view in vertical section taken on line 2—2 of Figure 1, and Figure 3 is a side elevation of a detail.

Referring to the drawings, in the construction shown therein, a weighing device indicated generally by the reference numeral 1 has a casing consisting of a top wall 2 and a floor 3, the top wall 2 and floor 3 at their edge portions being adapted to have interposed between them the edge portion 4 defining an aperture 5 in that side 6 of a piece of luggage shown fragmentarily in the drawings and which normally carries the handle. The casing is secured to the side 6 by rivets 7 extending through the wall 2, edge portion 4 and floor 3. The floor 3 of the casing is deepened to provide a housing for a cross-member 8 formed by a pair of adjacent parallel bars 9, adjacent end portions of the bars 9 being each secured by a cross-pin 10 to a vertically disposed pin 11 each of which is slidably mounted in an aperture 12 in the top wall 2. A compression spring 13 surrounds each pin 11 and extends between the inner side of the top wall 2 and the bars 9, the upper end of each pin 11 extending through the corresponding aperture 12 and through an aperture in a yoke 14 and having a head 15 whereby upward movement of each yoke 14 causes the pins 11 to be moved upwardly therewith. A handle 16 is pivoted at its ends between the yokes 14 about a common pivotal axis substantially parallel to the longitudinal axis of the cross-member 8, whereby the handle can be folded down on to the side 6 of the piece of luggage when not in use.

Each bar 9 also has a pair of upwardly extending posts 17 disposed symmetrically between its ends, adjacent posts 17 together forming a locating means for further compression springs 18 extending between the underside of the top wall 2 and the bars 9. Each bar 9 furthermore has a pair of symmetrically disposed lugs 19 disposed between the pins 11 and the posts 17, each lug 19 having an inclined upper surface.

An upwardly extending rack member 20 disposed between and pivoted to the bars 9 nearly half way therealong has its rack teeth 21 meshing with a pinion 22 fixed to a shaft 23 journalled in brackets 24 secured to the underside of the top wall 2, the shaft 23 having fixed to it a drum 25 whose periphery is graduated in calibrated units of weight. Part of the drum 25 extends above the general level of the top wall 2 which therefore is formed with a protuberance 26 housing the said part of the drum and having a slot 27 and pointer so that the corresponding part of the periphery of the drum 25 can be seen and a reading of the indicated units effected. The rack member 20 is biased in the direction of the pinion 22 by a coil spring 28 so as to maintain the rack teeth 21 in mesh with the pinion 22 notwithstanding slight variations in the longitudinal position of the bars 9.

A locking member 29, shown particularly in Figure 3, is disposed parallel to the bars 9 and is secured to the top wall 2 by means of a button 30 slidable in a slot 31 in the top wall 2, the button 30 being secured beneath the top wall 2 to the member 29, which can therefore be slid relative to the top wall 2 into either of two longitudinal positions. In one position, one of the laterally bent ends 32 of the member 29 is disposed between the adjacent lug 19 and pin 11, and the other bent end 32 is disposed between the adjacent lug 19 and post 17. The weighing device can operate whenever the weight of the piece of luggage is taken on the handle 16. In the other position of the locking member 29, the bent ends 32 ride up the inclined upper edges of the lugs 19 and interpose themselves between each lug 19 and the underside of the top wall 2, thereby preventing the bars 9 from moving upwardly in the casing when the weight of the luggage is taken on the handle 16, and thus rendering the weighing means inoperative. This position of the locking member 29, the bent ends 32 of which are shown in dot-and-dash lines in Figures 1 and 2, is the position normally used, when the handle functions just as a plain handle, and its other position, shown in full lines in Figures 1 and 2, is only employed where the weight of the luggage requires to be determined.

What is claimed is:

1. In a luggage unit, a weighing device comprising a casing having a floor-forming wall and a top wall thereover, an elongated cross-member disposed in said case parallel to said floor and normally disposed in spaced relation to said top wall, said cross member having end parts, a pair of vertically disposed pins each connected to an end part of said cross-member, said pins slidably mounted in said casing and projecting through openings supplied in said top wall, a handle attached to the projecting portions of said pins, tensioned springs having ends anchored in said casing and having opposite ends acting to press said corss-member downwardly to said floor, a rotary scale member journalled in said casing, a pinion supported on said casing for rotation with said scale member, and a rack member connected to said cross-member and upwardly extending therefrom, said rack member having meshing engagement with said pinion.

2. The structure defined in claim 1 wherein the springs include compression springs encircling said pins.

3. The structure defined in claim 1, in which the rack member is pivoted to the cross-member and pressed by a spring into meshing engagement with said pinion.

4. In a luggage unit, a weighing device comprising a casing having a floor-forming wall and a top wall thereover, an elongated cross-member disposed in said casing parallel to said floor and normally disposed in spaced relation to said top wall, said cross-member having end parts, a pair of vertically disposed pins each connected to an end part of said cross-member, said pins slidably mounted in said casing and projecting through openings supplied in said top wall, a handle attached to the projecting portions of said pins, tensioned springs having ends anchored in said casing and having opposite ends acting to press said cross-member downwardly to said floor, a rotary scale member journalled in said casing, a pinion supported on said casing for rotation with said scale member, a rack member connected to said cross-member and upwardly extending therefrom, said rack member having meshing engagement with said pinion, and manually operable means shiftably mounted on said casing and capable of blocking engagement with said cross member for preventing effective movement of said cross-member when it is desired to render the weighing device in-operative.

5. In a luggage unit, a weighing device comprising a casing having a floor-forming wall and a top wall thereover, an elongated cross-member disposed in said case parallel to said floor and normally disposed in spaced relation to said top wall, said cross-member having end parts, a pair of vertically disposed pins each connected to an end part of said cross-member, said pins slidably mounted in said casing and projecting through openings supplied in said top wall, a handle attached to the projecting portions of said pins, tensioned springs having ends anchored in said casing and having opposite ends acting to press said cross-member downwardly to said floor, a rotary scale member journalled in said casing, a pinion supported on said casing for rotation with said scale member, a rack member connected to said cross-member and upwardly extending therefrom, said rack member having meshing engagement with said pinion, symmetrically disposed lugs upwardly extending from said cross-member and having inclined upper surfaces, a locking member slidably mounted in said casing for movement parallel to said cross-member, lug-engaging elements on said locking member and movable with said locking member between a non-blocking position and a blocking position, said lug-engaging elements adapted in their blocking positions to have blocking engagement with said inclined upper surfaces of said lugs for preventing effective movement of said cross-member relative to said casing, whereby to render the weighing device inoperative.

References Cited in the file of this patent
UNITED STATES PATENTS

| 1,221,673 | Canty | Apr. 3, 1917 |

FOREIGN PATENTS

| 531,634 | Canada | Oct. 9, 1956 |